(12) United States Patent
Dai et al.

(10) Patent No.: US 7,879,470 B2
(45) Date of Patent: Feb. 1, 2011

(54) APPARATUS, SYSTEM, AND METHOD FOR THE SELECTION OF PERPENDICULAR MEDIA SEGREGANT MATERIALS

(75) Inventors: Qing Dai, San Jose, CA (US); Hoa V. Do, Fremont, CA (US); Bruno Marchon, Palo Alto, CA (US); Kentaro Takano, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 502 days.

(21) Appl. No.: 11/940,960

(22) Filed: Nov. 15, 2007

(65) Prior Publication Data

US 2009/0130490 A1   May 21, 2009

(51) Int. Cl.
   *G11B 5/65* (2006.01)
(52) U.S. Cl. .................. 428/836.2; 428/836.3
(58) Field of Classification Search ............... 428/836.2
   See application file for complete search history.

(56) References Cited

U.S. PATENT DOCUMENTS

| | | | | |
|---|---|---|---|---|
| 7,105,240 | B2 | 9/2006 | Wu et al. ................. | 428/832.1 |
| 7,482,071 | B2 * | 1/2009 | Do et al. .................. | 428/836.2 |
| 2003/0162055 | A1 | 8/2003 | Lu et al. ..................... | 428/694 |
| 2004/0106010 | A1 | 6/2004 | Iwasaki et al. .............. | 428/694 |
| 2004/0247942 | A1 | 12/2004 | Wu et al. .................... | 428/694 |
| 2005/0181239 | A1* | 8/2005 | Ma et al. .................... | 428/835 |
| 2005/0027122 | A1 | 10/2005 | Takakashi et al. ......... | 428/832.1 |
| 2006/0014051 | A1 | 1/2006 | Iso et al. ..................... | 428/832 |
| 2006/0233658 | A1 | 10/2006 | Zaini ........................... | 419/19 |
| 2006/0234091 | A1 | 10/2006 | Racine et al. ............. | 428/836.2 |
| 2007/0002481 | A1 | 1/2007 | Kikitsu et al. ................. | 360/48 |
| 2007/0042227 | A1 | 2/2007 | Iwasaki et al. .............. | 428/832 |

FOREIGN PATENT DOCUMENTS

| | | |
|---|---|---|
| JP | 2004206805 | 7/2004 |
| JP | 2004272958 | 9/2004 |
| WO | WO2005034095 | 4/2005 |

OTHER PUBLICATIONS

Girt et al., "Influence of Oxide on the Structural and Magnetic Properties of CoPt Alloy", Journal of Applied Physics 99, 08E715 (2006).

(Continued)

*Primary Examiner*—Mark Ruthkosky
*Assistant Examiner*—Gary Harris
(74) *Attorney, Agent, or Firm*—Kunzler Needham Massey & Thorpe (57) ABSTRACT

A method for improving magnetic grain segregation in perpendicular recording media includes providing a substrate comprising a rigid support structure, depositing a soft underlayer on top of the substrate depositing an intermediate layer on top of the soft underlayer, providing a plurality of prospective segregants, determining the surface energies and the heat of formation of the prospective segregants and selecting the prospective segregant with a low surface energy and a high heat of formation. The method also includes providing at least one layer with surface energies progressively increasing to minimize the difference between the surface energy of a carbon overcoat and the segregant.

18 Claims, 7 Drawing Sheets

OTHER PUBLICATIONS

Choe et al., "Magnetic and Recording Characteristics of Reactively Sputtered CoPtCr-(Si-O, Ti-O, and Cr-O) Perpendicular Media", IEEE Transactions on Magnetics, vol. 42, No. 10, Oct. 2006.

Nolan et al., "Microstructure and Exchange Coupling of Segregated Oxide Perpendicular Recording Media", IEEE Transactions on Magnetics, vol. 43, No. 2, Feb. 2007.

Dai et al., "Tribological Issues in Perpendicular Recording Media", Tribology Letters, in press.

CoPtCr-Sio(2) granular media for high-density perpendicular recording, Author(s): Uwazumi H, Enomoto K, Sakai Y, Takenoiri S, Oikawa T, Watanabe S, IEEE Transactions on Magnetics 39 (4): 1914-1918 Part 1, Jul. 2003.

Surface Energy (Surface Wetting Capability), NDT Resource Center, http://www.ndt-ed.org/EducationResources/CommunityCollege/PenetrantTest/PTMaterials...

Surface Composition of Binary-Systems—Prediction of Surface Phase-Diagrams of Solid-Solutions, Overbury S, Bertrand PA, Somorjai GA, Chemical Reviews 75 (5): 547-560 1975.

* cited by examiner

| Oxide | Surface Energy (erg/cm$^2$) | Magnetic Performance |
|---|---|---|
| MgO | 1.20 | Poor |
| Al$_2$O$_3$ | 0.69 | Poor |
| SiO$_2$ | 0.60 | Good |
| TiO$_2$ | 0.38 | Better |
| Ta$_2$O$_5$ | 0.28 | Very good |

Fig. 8

APPARATUS, SYSTEM, AND METHOD FOR THE SELECTION OF PERPENDICULAR MEDIA SEGREGANT MATERIALS

BACKGROUND OF THE INVENTION

1. Field of the Invention

This invention relates to an apparatus, method and system for fabricating highly segregated magnetic grains on a substrate and more particularly relates to a guide method for selecting segregant materials which produce improved magnetic characteristics.

2. Description of the Related Art

Hard-disk drives provide data storage for data processing systems in computers and servers, and are becoming increasingly pervasive in media players, digital recorders, and other personal devices. Advances in hard-disk drive technology have made it possible for a user to store an immense amount of digital information on an increasingly small disk, and to selectively retrieve and alter portions of such information almost instantaneously. Particularly, recent developments have simplified hard-disk drive manufacture while yielding increased track densities, thus promoting increased data storage capabilities at reduced costs.

In a hard-disk drive, rotating high precision aluminum or glass disks are coated on both sides with a special thin film media designed to store information in the form of magnetic patterns. Electromagnetic read/write heads suspended or floating only fractions of micro inches above the disk are used to either record information onto the thin film media, or read information from it.

A read/write head may write information to the disk by creating an electromagnetic field to orient a cluster of magnetic grains, known as a bit, in one direction or the other. To read information, magnetic patterns detected by the read/write head are converted into a series of pulses which are sent to the logic circuits to be converted to binary data and processed by the rest of the system. To increase the capacity of disk drives, manufacturers are continually striving to reduce the size of bits and the grains that comprise the bits.

The ability of individual magnetic grains to be magnetized in one direction or the other, however, poses problems where grains are extremely small. The superparamagnetic effect results when the product of a grain's volume (V) and its anisotropy energy ($K_u$) fall below a certain value such that the magnetization of that grain may flip spontaneously due to thermal excitations. Where this occurs, data stored on the disk is corrupted. Thus, while it is desirable to make smaller grains to support higher density recording with less noise, grain miniaturization is inherently limited by the superparamagnetic effect.

As the Hard-Drive industry is transitioning to perpendicular recording technology, adjustments are being made to adapt the disk media so that the magnetic c-axis (or easy axis) of the Cobalt alloy grows perpendicular to the disk plane. Most media manufacturers now rely on a Cobalt alloy with the incorporation of an oxide segregant to promote the formation of small and uniform grains. Researchers have observed that perpendicular media tends to grow rougher than its longitudinal counterpart. Further, researchers have discovered that rougher media creates a product with superior magnetic performance. So far no methods have been proposed that attempt to address the origin of the nanoscale roughness of perpendicular recording media. Therefore, researchers are left to search for satisfactory segregrants that provide the desired magnetic performance and corresponding media roughness using trial and error.

A rough recording media, though superior magnetically, has much deeper valleys between the magnetic grains than smooth recording media. This creates a perpendicular recording media with corrosion and flyability performance problems.

Accordingly, a need exists for a practical, attainable apparatus, system, and method for selecting a segregant material which will produce a magnetic recording layer with highly segregated magnetic grains to enhance the magnetic performance. Beneficially, such an apparatus, system and method would cooperate with the overcoat layer to reduce corrosion and improve flyability performance. Such apparatuses, systems and methods are disclosed and claimed herein.

SUMMARY OF THE INVENTION

The present invention has been developed in response to the present state of the art, and in particular, in response to the problems and needs in the art that have not yet been fully solved by currently available apparatus, systems and methods. Accordingly, the present invention has been developed to provide apparatus, system and methods for selecting a segregant material which provides superior magnetic performance of perpendicular magnetic recording media while maintaining a topography that overcomes many or all of the above-discussed shortcoming in the art.

In one embodiment in accordance with the invention, a recording medium for perpendicular recording applications includes a substrate comprising a rigid support structure for depositing a plurality of layers thereon, an overcoat layer comprising a protective coating, a soft underlayer formed on top of the substrate, an intermediate layer disposed between the soft underlayer and the overcoat, a perpendicular magnetic recording layer disposed between the intermediate layer and the overcoat layer. The soft underlayer comprises a cobalt containing material. The intermediate layer comprises a ruthenium containing material. The perpendicular magnetic recording layer has a coercivity and an axis of magnetic anisotropy substantially perpendicular to the surface of the media. The perpendicular magnetic recording layer further comprises a plurality of magnetic grains and a segregant. The segregant comprises a material having a heat of formation greater than 130 kilocalories per mole and less than 230 kilocalories per mole and a surface energy less than 300 milijoules per square meter.

In certain embodiments, the segregant may comprise a material such as an Oxide, Nitride, or Carbide. In selected embodiments, the segregant material comprises an Oxide selected from the from the group consisting of a Tungsten Oxide, Vanadium Oxide, Molybdenum Oxide, Rhenium Oxide, Germanium Oxide, and Tantalum Oxide.

In another embodiment in accordance with the invention, a recording medium for perpendicular recording applications includes a substrate comprising a rigid support structure for depositing a plurality of layers thereon, an overcoat layer comprising a protective coating, a soft underlayer formed on top of the substrate, an intermediate layer disposed between the soft underlayer and the overcoat, a perpendicular magnetic recording layer disposed between the intermediate layer and the overcoat layer and at least one coating layer disposed between the perpendicular magnetic recording layer and the overcoat layer. The soft underlayer comprises a cobalt containing material. The intermediate layer may comprise a ruthenium containing material. The perpendicular magnetic recording layer has a coercivity and an axis of magnetic anisotropy substantially perpendicular to the surface of the media. The perpendicular magnetic recording layer further comprises a cobalt alloy selected from the group consisting of CoPt and CoPtCr. The perpendicular magnetic recording layer further comprises a segregant. The segregant comprises a material having a heat of formation greater than 130 kilocalories per mole and less than 230 kilocalories per mole and a surface energy less than 300 milijoules per square meter. The at least one coating layer comprises a material having a surface energy greater than the prior adjacent layer.

In certain embodiments a plurality of coating layers may be disposed between the perpendicular magnetic recording layer and the overcoat layer with each coating layer comprising a material having a surface energy that is progressively greater than the prior adjacent layer. In selected embodiments, the recording medium for perpendicular recording applications includes a capping layer disposed between the plurality of coating layers and the overcoat layer.

In another embodiment in accordance with the current invention, a method for producing a perpendicular magnetic recording media with increased grain segregation includes providing a substrate comprising a rigid support structure for depositing a plurality of layers thereon, depositing a soft underlayer on top of the substrate, depositing an intermediate layer on top of the soft underlayer, providing a plurality of prospective segregants, selecting the prospective segregant with a lowest surface energy, and forming a magnetic recording layer on top of the intermediate layer. Each prospective segregant comprising a material with a heat of formation greater than 130 kilocalories per mole and less than 230 kilocalories per mole and a surface energy less than 300 milijoules per square meter. The magnetic recording layer has a first coercivity and an axis of magnetic anisotropy substantially perpendicular to the surface thereof. The magnetic recording layer comprising a Cobalt alloy and the prospective segregant selected.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are disclosed to provide a thorough understanding of embodiments of the present invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
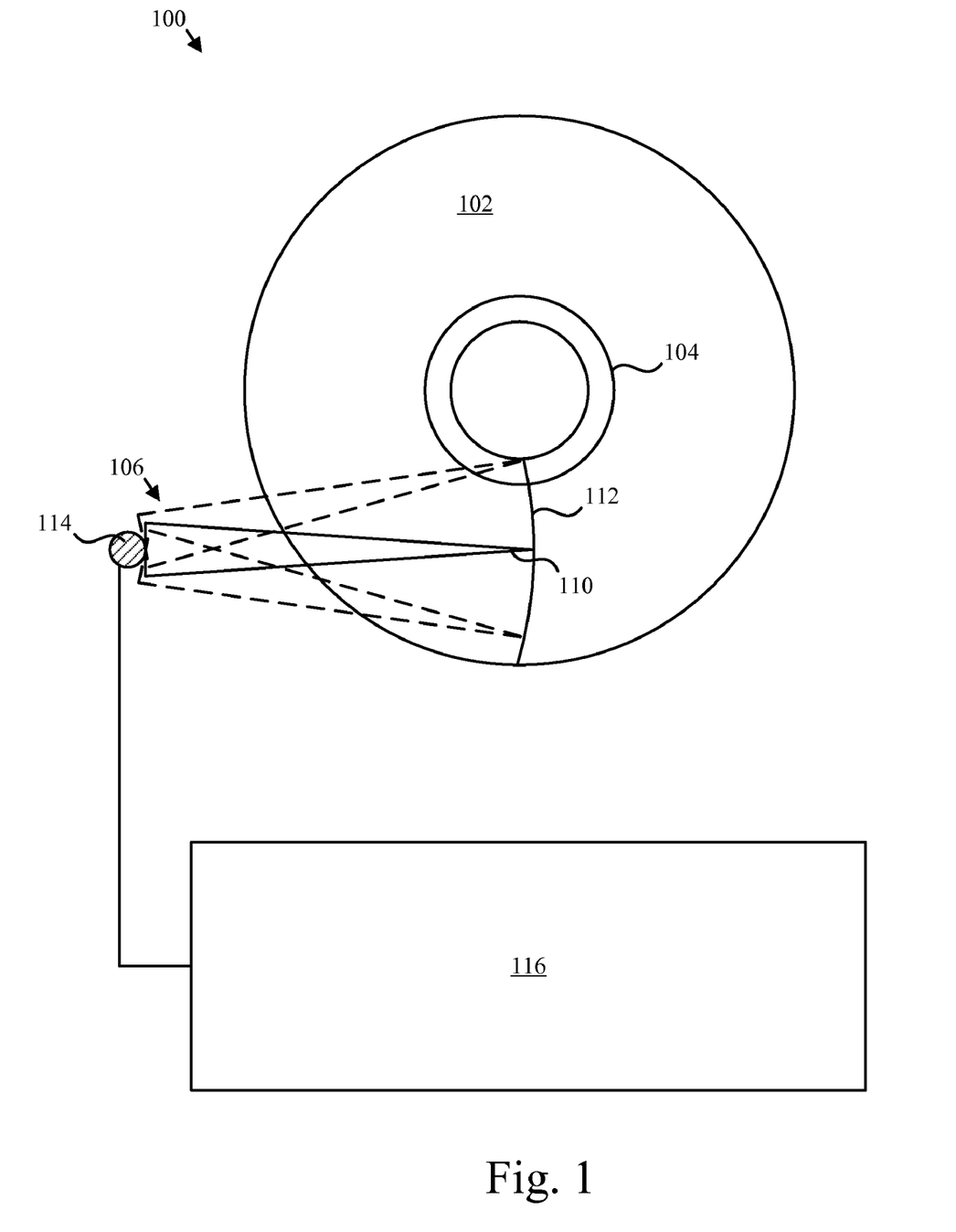
FIG. 1 is a top view of a hard-disk drive.

Referring now to FIG. 1, a diagram of a conventional hard-disk drive assembly 100 is shown. A hard-disk drive assembly 100 generally comprises a plurality of hard disks comprising a magnetic recording media 102, rotated at high speeds by a spindle motor (not shown) during operation. The magnetic recording media 102 will be more fully describe herein. Concentric data tracks 104 formed on either or both disk surfaces receive and store magnetic information.

A read/write head 110 may be moved across the disk surface by an actuator assembly 106, allowing the head 110 to read or write magnetic data to a particular track 104. The actuator assembly 106 may pivot on a pivot 114. The actuator assembly 106 may form part of a closed loop feedback system, known as servo control, which dynamically positions the read/write head 110 to compensate for thermal expansion of the disks 102 as well as vibrations and other disturbances. Also involved in the servo control system is a complex computational algorithm executed by a microprocessor, digital signal processor, or analog signal processor 116 that receives data address information from an associated computer, converts it to a location on a disk 102, and moves the read/write head 110 accordingly.

Specifically, read/write heads 110 periodically reference servo patterns recorded on the disk to ensure accurate head 110 positioning. Servo patterns may be used to ensure a read/write head 110 follows a particular track accurately, and to control and monitor transition of the head 110 from one track 104 to another. Upon referencing a servo pattern, the read/write head 110 obtains head position information that enables the control circuitry 116 to subsequently re-align the head 110 to correct any detected error.

Servo patterns may be contained in engineered servo sectors 112 embedded within a plurality of data tracks 104 to allow frequent sampling of the servo patterns for optimum disk drive performance. In a typical hard disk 102, embedded servo sectors 112 extend substantially radially from the disk 102 center, like spokes from the center of a wheel. Unlike spokes however, servo sectors 112 form a subtly arc-shaped path calibrated to substantially match the range of motion of the read/write head 110.

Figure 2:
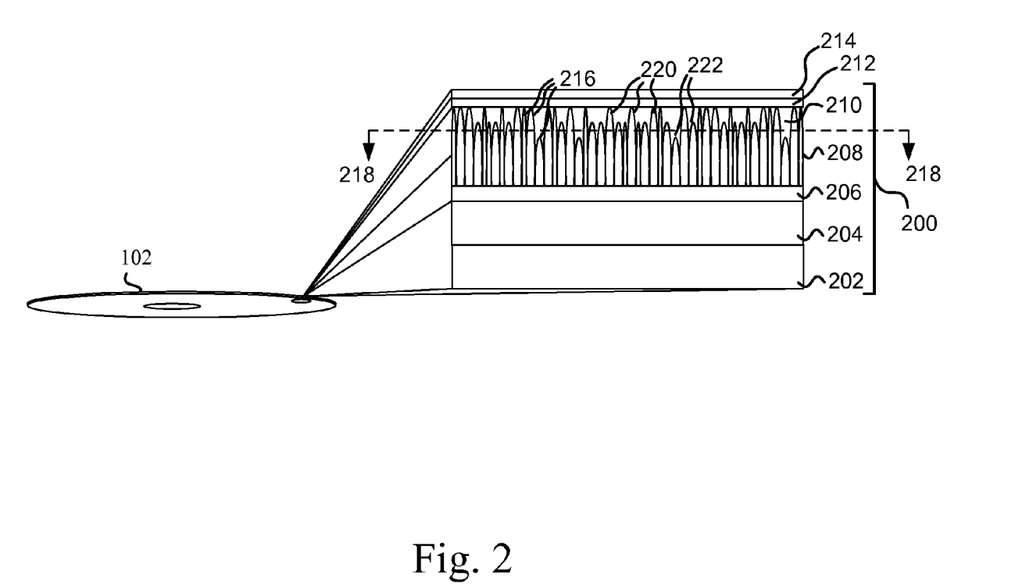
FIG. 2 is a cut away view of the layers of a perpendicular recording media in accordance with the present invention.

FIG. 2 illustrates a close-up view of the various layers 200 comprising the recording medium 102 for perpendicular magnetic recording applications. Layers 200 may include a substrate 202, a soft underlayer 204, an intermediate layer 206, a perpendicular magnetic recording layer 208, a coating layer 210, a capping layer 212 and an overcoat 214. In some embodiments coating layer 210 and capping layer 212 may be excluded from layers 200.

The platter or substrate 202 provides a rigid support structure upon which the recording media is deposited. Deposition may be in the form of physical or chemical vapor deposition which comprises a process whereby groups of atoms are bombarded with ions causing atoms near the surface to be released from the group. The process is conducted in a vacuum and the atoms ejected deposit on the substrate 202 creating a thin film on the substrate 202. In certain embodiments ion beam deposition or magnetron sputtering may be used.

In one embodiment, the first layer deposited on substrate 202 is a soft underlayer 204. The material comprising the soft underlayer 204 is a soft, magnetic, cobalt containing alloy located under the intermediate layer 206. The soft underlayer 204 may provide a return path for magnetic write fields 302 generated by the read/write head 110 illustrated in FIG. 3. When writing, the write head 110 generates a magnetic write field 302 (See FIG. 3) that travels vertically through the magnetic recording layer 208 and returns to the write head 110 through the soft underlayer 204.

The intermediate layer 206 is deposited on the soft underlayer 204. The intermediate layer 206 may comprise a seed layer layer comprising NiTa or NiW. The intermediate layer 206 may further comprise a Ru layer in addition to the NiTa or NiW seed layer. The seed layer establishes an appropriate nucleation base for intermediate layer 206 and creates a crystaline lattice microstructure for improving the topography of the magnetic layer 208. Various materials may be used for the seed layer such as Al, Cr, $Ni_3P$, Ta, C, NiTa, NiW, FeAl and NiAl. The intermediate layer 206 is disposed between the underlayer 204 and the magnetic layer 208.

The magnetic recording medium 102 includes a magnetic recording layer 208, to store data. The magnetic recording layer 208 may be deposited on top of the intermediate layer 206. The magnetic recording layer 208 may comprise a plurality of magnetic grains 216 each having a magnetic easy axis substantially perpendicular to the media surface, thereby allowing the grains 216 to be vertically magnetized. As stated above, when writing, the write head 110 generates a magnetic write field 302 (Referring now to FIG. 3) that travels vertically through the magnetic recording layer 208 and returns to the write head 110 through the soft underlayer 204. In this manner, the write head 110 magnetizes vertical regions 304, or bits 304, in the magnetic recording layer 208. Because of the easy axis orientation, each of these bits 304 has a magnetization 306 that points in a direction substantially perpendicular to the media surface.

Figure 3:
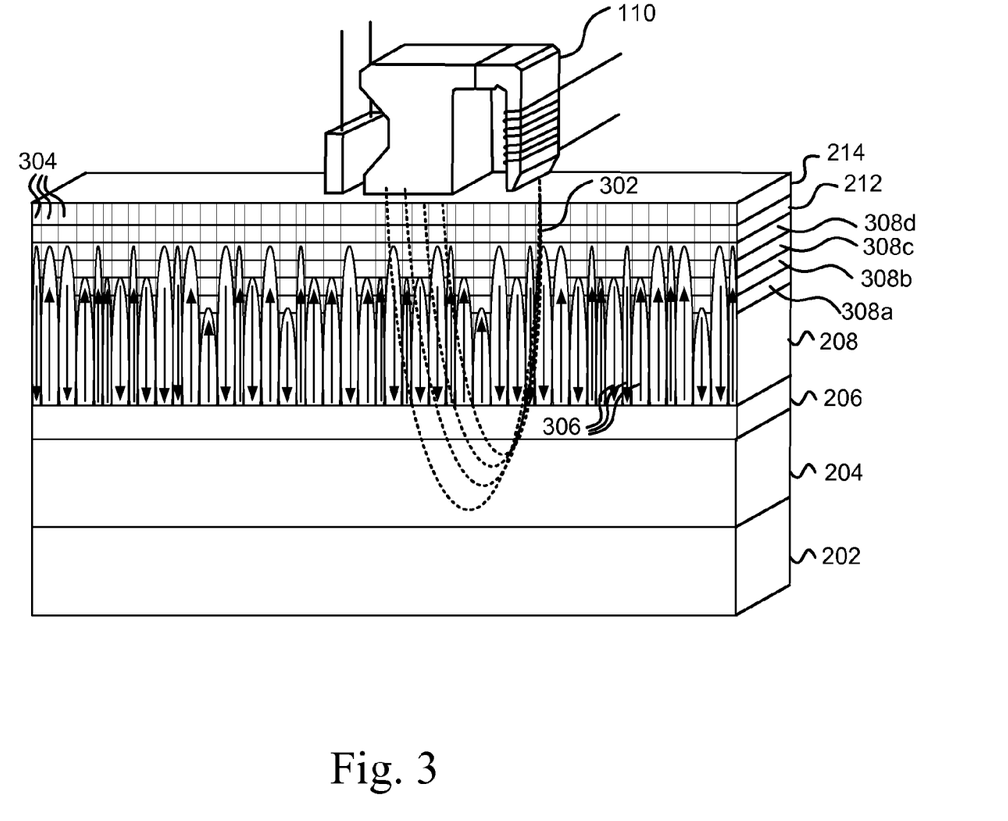
FIG. 3 is a cut away view of the layers of a perpendicular recording media showing coating layers in accordance with the present invention.

Because of the ability to utilize a soft underlayer 204 in the perpendicular geometry, write fields generated by the perpendicular write head 110 may be substantially larger than conventional longitudinal recording write fields. This allows use of media 102 having a higher coercivity (Hc) and anisotropy energy (Ku), which is more thermally stable. Furthermore, unlike longitudinal recording, where the magnetic fields between two adjacent bits have a destabilizing effect, the magnetic fields of magnetization 306 of bits in perpendicular recording media 102 stabilize each other, enhancing the overall stability of perpendicular magnetic recording media even further. This allows for closer bit packing.

Figure 4:
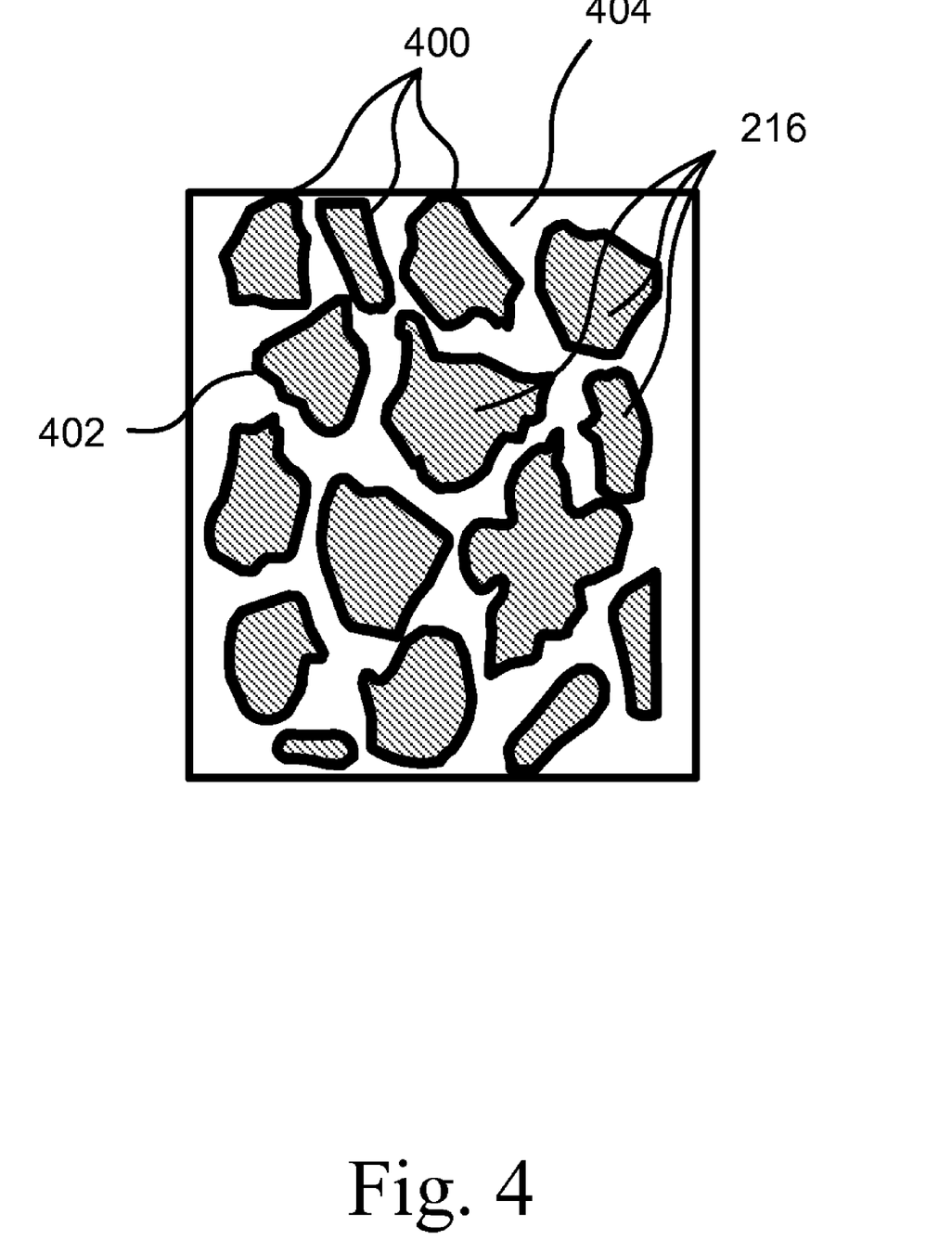
FIG. 4 is a cut away view, taken along line 218 of FIG. 2, showing magnetic grains separated by a segregant in accordance with the present invention.
Figure 8:
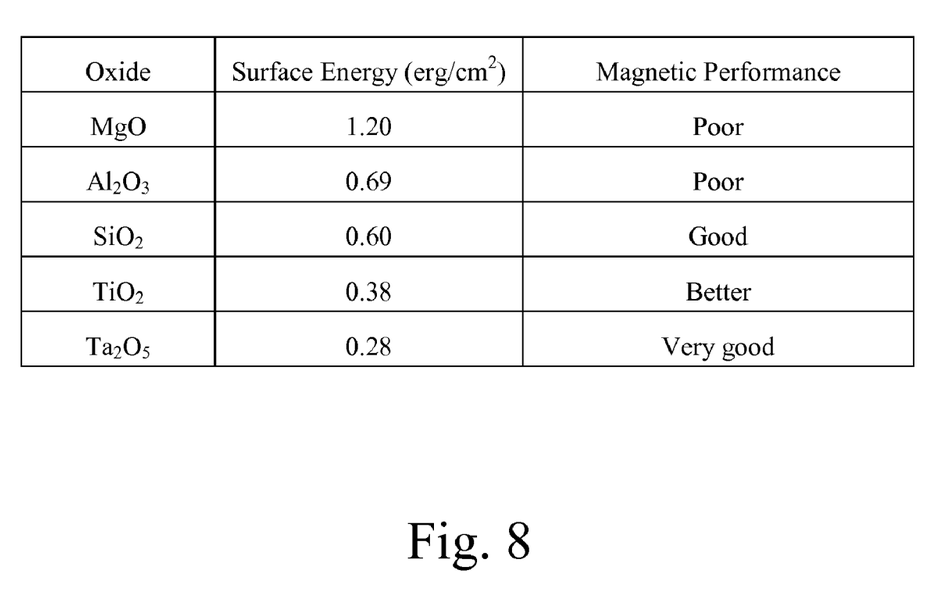
FIG. 8 is a table showing surface energy of oxide segregants and magnetic performance.

Turning now to FIG. 4, a cutaway view taken along line 218 of FIG. 2 is shown. Perpendicular recording media technology relies on a media with small, well-segregated grains 216 connected by amorphous grain boundaries 402. Oxide segregants with low surface energies produce media with better magnetic performance than oxide segregants with higher surface energies. Surface energy quantifies the distribution of chemical bonds that occur when a surface is created. The lower the surface area, the lower the total energy of the system for a given substance. The molecules of materials with low surface energies are more tightly bound than materials with higher surface energies. Surfaces are intrinsically less energetically favorable than the bulk of material. Therefore, to minimize the system's total energy, the molecules of a material with a low surface energy will tend to move to the outside of the bulk, leaving the high surface energy materials in the middle. This characteristic can be utilized to stabilize smaller magnetic grains which are inherently unstable. As stated above, the smaller the magnetic grains 216, the better the media performs. Because segregation is affected by surface energy, segregants with lower surface energy stabilize small grains better than segregants with a higher surface energy. For example, when MgO, with a surface energy of 1.20 $erg/cm^2$, is used as the segregant, the resulting media performs poorly. However, $Ta_2O_5$ has a surface energy equivalent to 280 milijoules/square meter and performs very well magnetically indicating that the magnetic grains are more segregated with the $Ta_2O_5$ than the MgO segregant. Additional examples of surface energies of oxide segregants versus magnetic performance are shown in FIG. 8.

Referring again to FIG. 4, magnetic grains 216 are encompassed by a segregant 400 at the grain boundary 402. Segregant 400 comprises a thin wall of segregant material surrounding the magnetic portion of the grain 216. Space between magnetic grains 216 is illustrated by void 404. The magnetic grains 216 comprise a magnetic material such as CoPt or CoPtCr. To maintain a highly segregated magnetic layer 208, a small percentage of segregant 400 (between 2-8%) may be added to the material. The addition of the segregant results in the magnetic grains 216 approximately 10 nanometers or less in diameter with segregant congregated at the grain boundaries 402. The segregants comprise materials with surface energy levels much lower than the magnetic metal alloy. Therefore, the segregants congregate at the boundary of the grain during deposition due to the characteristics associated with materials with low surface energies as discussed above. In addition to low surface energy, a segregant also needs a high enthalpy (or heat) of formation from its metal parent. Enthalpies of formation are closely related to bond strengths or energies. Therefore, a segregant with a high enthalpy of formation indicates that the chemical bonds of the segregant are stronger than a segregant with a correspondingly lower enthalpy of formation. Thus, a segregant with a high enthalpy of formation has stronger chemical bonds than segregants with lower enthalpies of formation. The stronger the chemical bonds of a segregant the more difficult it will be to break the bonds. The molecules comprising segregants with high enthalpies of formation concentrate together at the grain boundaries 402 providing a structure with highly segregated magnetic grains 216. In this manner, the oxide or other segregant material 400 stabilizes the small magnetic grains 216.

In one embodiment, the segregant comprises an oxide such as a tungsten oxide, vanadium oxide, molybdenum oxide, rhenium oxide, germanium oxide, tantalum oxide, etc. In other embodiments, the segregant may comprise other materials such as nitrides and carbides or a combination of nitrides, carbides and oxides.

Figure 6:
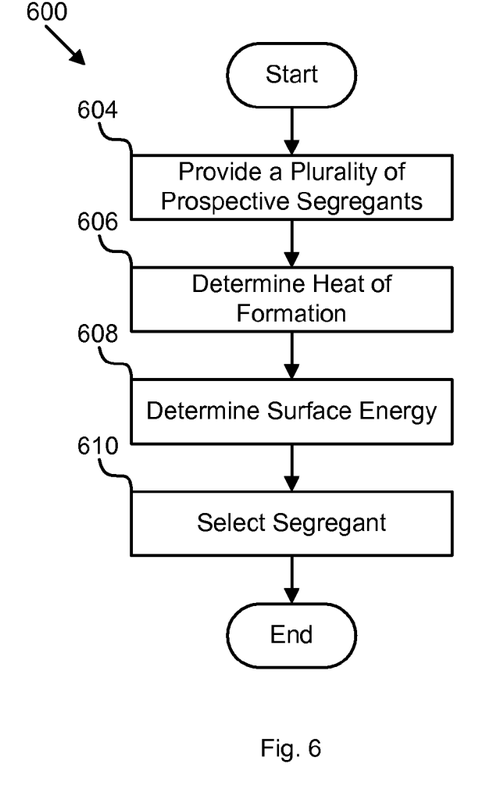
FIG. 6 is a flowchart showing a method of selecting a segregant in accordance with the present invention.

FIG. 6 is a flowchart diagram depicting one embodiment of a method for selecting a segregant for perpendicular recording media in accordance with the present invention. As depicted, the segregant selection method 600 includes providing 604 a plurality of prospective segregants, determining 606 the heat of formation for each proposed segregant, determining 608 the surface energy for each prospective segregant, and selecting 610 the segregant with the appropriate characteristics. Appropriate segregant characteristics include surface energies, heat of formation or a combination of these. The segregant selection method 600 may be used to select a segregant which will provide optimum magnetic performance characteristics.

Figure 5:
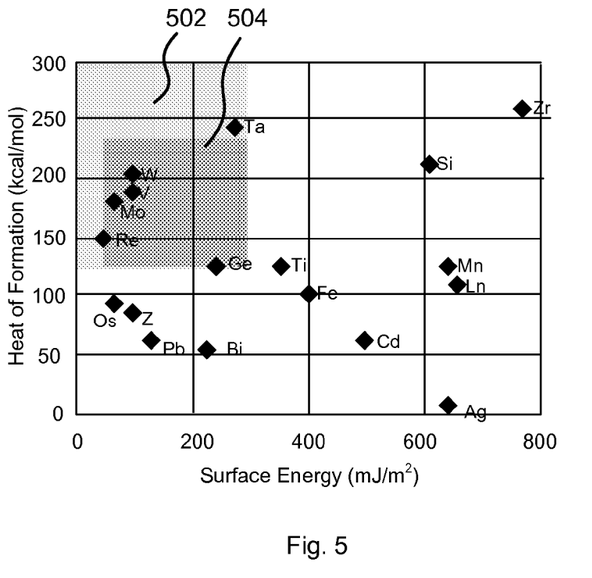
FIG. 5 is a chart showing heat of formation versus surface energy of oxides in accordance with the present invention.

Providing 604 a plurality of prospective segregants may comprise providing prospective segregants with an enthalpy or heat of formation above 130 kilocalories per mole as indicated by the box 502 in FIG. 5. In one embodiment, the heat of formation for the prospective segregants provided may be between 130 kilocalories per mole and 230 kilocalories per mole as indicated by box 504. In addition to a high heat of formation, the prospective segregants provided may comprise materials with surface energies below 300 milijoules per square meter. In one embodiment, the prospective segregants provided may comprise materials with surface energies between 50 and 300 milijoules per square meter as indicated by box 504 of FIG. 5.

Determining 606 heat of formation and determining 608 surface energy may comprise empirical testing of the prospective segregants. Alternatively the heat of formations and surface energies of prospective segregants may be provided by previously recorded data.

Selecting 610 a prospective segregant may comprise selecting the segregant with the lowest surface energy as determined 608. In order to stabilize a very small grain (<8 nm in diameter) of magnetic material such as a cobalt alloy, surface energies of the segregant should be minimized. This is similar to using a surfactant such as soap to stabilize water bubbles. According to one embodiment, the segregant may be selected which has a high enthalpy (heat) of formation (above 130 kilocalories per mole) and a low surface energy (below 300 milijoules per square meter). In another embodiment the guide may comprise a selection method in which the segregant is selected which has the highest enthalpy (heat) of formation and lowest surface energy.

In one embodiment an appropriate segregant may be selected based on previously recorded data. Thus, in this embodiment the provision 604 of prospective segregants step may be eliminated.

Referring again to FIG. 2, when a cobalt containing alloy such as CoPtCr is co-deposited with an oxide in the magnetic layer 208, the oxide moves to the grain boundary. This segregation results in a magnetically superior performing media. However, the grains form peaks 220 and valleys 222 due to some grains being larger than others. The segregated structure of the magnetic grains 216 in the magnetic layer 208 may introduce a surface roughness of several nanometers amplitude which may be difficult to cover with capping layer 212 or a carbon overcoat 214. To achieve adequate coverage a thicker carbon overcoat 214 may be used than would otherwise be necessary if the magnetic layer 208 were smooth. Similarly, when the magnetic recording media 102 is rougher, the read/write head 110 must fly at a higher height than with a smooth magnetic recording media. This may result in the media becoming worn if the read/write head 110 inadvertently contacts the peaks 220 on the surface of the media. The rough media also results in corrosion at the top of the peaks 220 and in the depths of the valleys 222 due to poor coverage by the overcoat layer 214.

In addition to topographical issues, chemical characteristics of the segregant materials may enhance corrosion problems. The covering ability of the carbon overcoat 214 is of function of the surface energy difference between the carbon overcoat 214 and the material comprising the layer directly below the carbon overcoat 214. The carbon overcoat 214 comprises a material with a relatively high surface energy. When a cluster of the carbon overcoat 214 rests on a material with a low surface energy, the surface tension of the low surface energy material will cause the cluster to "bead up". For example, water tends to "bead up" on a freshly waxed car. When the surface energy of the underlying material exceeds the surface tension of carbon overcoat 214 the overcoat cluster will flatten out providing better coverage. The higher the surface energy of the underlying material relative to the surface tension of the carbon overcoat 214, the better the coverage. Because the segregants located on the grain boundaries have low surface energies, coverage with a high surface energy carbon overcoat 214 is difficult. To resolve this issue, the difference between the surface energy for the carbon overcoat 214 and the underlying material should be minimized. An intermediate coating layer 210 may be deposited on the magnetic layer 208. The coating layer 210 may comprise a material with a surface energy higher than the segregant but lower than the surface energy of the carbon overcoat 214. To planarize the surface even more dramatically, a capping layer 212 comprising a metal material may be disposed between a coating layer 210 and the overcoat layer 214. The metal material comprising the capping layer 212 may have a surface energy between the carbon overcoat layer 214 and the coating layer 210 immediately adjacent the capping layer 212.

FIG. 3 illustrates another embodiment wherein a plurality of intermediate coating layers 308a-308d are disposed between the magnetic layer 208 and the overcoat layer 214. Each intermediate coating layer 308a-308d may have a progressively higher surface energy than the adjacent layer below the coating layer 308a-308d. This progressive transition from a lower surface energy to a higher surface energy allows the overcoat layer 214 to provide greater coverage, while minimizing surface energy repelling interactions. A capping layer 212 comprising a metal material may be disposed between the coating layer 210 and the overcoat layer 214.

Figure 7:
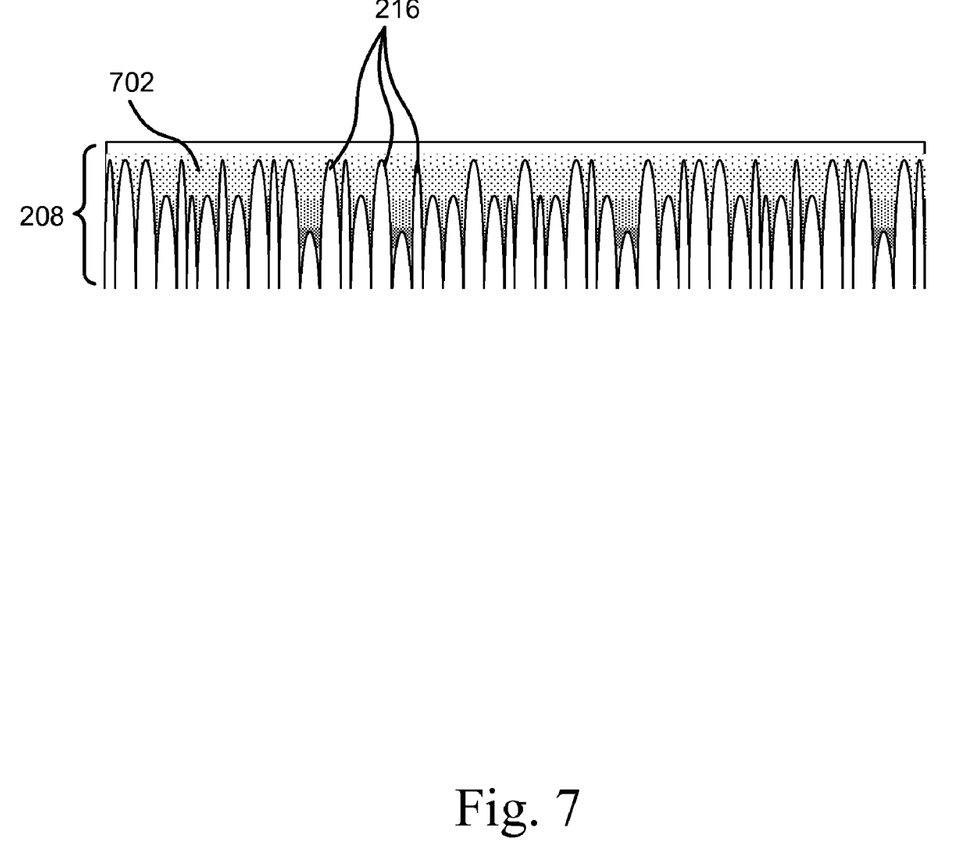
FIG. 7 is a cut away view of the layers of a perpendicular recording media showing a gradual reduction in oxides in accordance with the present invention.

FIG. 7 illustrates another embodiment of the current invention in which only the magnetic layer 208 is show. Oxygen 702 may be gradually decreased as the magnetic grains 216 and segregant 400 are deposited. The higher concentration of oxygen 702 is illustrated by the darker shading near the bottom of the coating layer 210. By reducing the oxygen 702 less oxygen is available to produce the low surface energy oxide. This results in a magnetic layer 208 with a progressively higher surface energy oxide segregant at the grain boundaries and on its surface. Consequently, better coverage by a coating layer 210 is achieved.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A recording medium for perpendicular recording applications, the recording medium comprising:
   a substrate;

an overcoat layer;
a soft underlayer formed on top of the substrate;
an intermediate layer disposed between the soft underlayer and the overcoat;
a perpendicular magnetic recording layer disposed between the intermediate layer and the overcoat layer, the perpendicular magnetic recording layer selected to have a coercivity and an axis of magnetic anisotropy substantially perpendicular to the surface thereof;
the perpendicular magnetic recording layer comprising a plurality of magnetic grains and a segregant, the segregant comprising a material selected to have a heat of formation greater than about 130 kilocalories per mole and less than about 230 kilocalories per mole and a surface energy less than about 300 milijoules per square meter; and
at least one coating layer disposed immediately adjacent to the perpendicular magnetic recording layer between the perpendicular magnetic recording layer and the overcoat layer, the at least one coating layer comprising a material having a surface energy that is greater than a prior adjacent layer.

2. The recording medium of claim 1, wherein the segregant comprises an Oxide.

3. The recording medium of claim 2, wherein the Oxide is selected from the from the group consisting of a Tungsten Oxide, Vanadium Oxide, Molybdenum Oxide, Rhenium Oxide, Germanium Oxide and Tantalum Oxide.

4. The recording medium of claim 1, wherein the segregant comprises a Nitride.

5. The recording medium of claim 1, wherein the segregant comprises a Carbide.

6. The recording medium of claim 1, wherein the segregant comprises a material with a surface energy between about 80 milijoules per square meter and about 300 milijoules per square meter.

7. The recording medium of claim 1, wherein the magnetic grains comprise an alloy selected from the group consisting of CoPt and CoPtCr.

8. A recording medium for perpendicular recording applications, the recording medium comprising:
a substrate comprising a rigid support structure for depositing a plurality of layers thereon;
an overcoat layer comprising a protective coating;
a soft underlayer disposed on top of the substrate, the soft underlayer comprising a cobalt containing alloy;
an intermediate layer disposed between the soft underlayer and the overcoat layer, the intermediate layer comprising a ruthenium containing material;
a perpendicular magnetic recording layer disposed between the soft underlayer and the overcoat layer, the perpendicular magnetic recording layer selected to have a coercivity and an axis of magnetic anisotropy substantially perpendicular to the surface thereof, the perpendicular magnetic recording layer comprising a cobalt alloy selected from the group consisting of CoPt and CoPtCr and a segregant comprising a material with a heat of formation greater than about 130 kilocalories per mole and less than about 230 kilocalories per mole and a surface energy less than about 300 milijoules per square meter; and
a plurality of coating layers disposed between the perpendicular magnetic recording layer and the overcoat layer, each coating layer comprising a material having a surface energy that is progressively greater than a prior adjacent layer.

9. The recording medium of claim 8, wherein the segregant is selected from the group consisting of Oxides, Nitrides, and Carbides.

10. The recording medium of claim 8, further comprising a capping layer disposed between the at least one coating layer and the overcoat layer, the capping layer comprising a metal coating.

11. A recording device for perpendicular recording applications, the recording device comprising:
a recording head for reading magnetic signals from, and writing magnetic signals to, a recording medium; and
a recording medium configured for perpendicular recording, the recording medium comprising:
a substrate comprising a rigid support structure for depositing a plurality of layers thereon;
an overcoat layer comprising a protective coating;
a soft underlayer disposed on top of the substrate, the soft underlayer comprising a cobalt containing alloy;
an intermediate layer disposed between the soft underlayer and the overcoat layer, the intermediate layer comprising a ruthenium containing material; and
a perpendicular magnetic recording layer disposed between the soft underlayer and the overcoat layer, the perpendicular magnetic recording layer having a coercivity and an axis of magnetic anisotropy substantially perpendicular to the surface thereof, the perpendicular magnetic recording layer comprising a cobalt alloy selected from the group consisting of CoPt and CoPtCr and a segregant comprising a material with a heat of formation greater than about 130 kilocalories per mole and less than about 230 kilocalories per mole and a surface energy less than about 595 milijoules per square meter; and
at least one coating layer disposed immediately adjacent to the perpendicular magnetic recording layer between the perpendicular magnetic recording layer and the overcoat layer, the at least one coating layer comprising a material having a surface energy that is greater than a prior adjacent layer.

12. The recording device for perpendicular recording applications of claim 11, wherein the at least one coating layer further comprises:
a plurality of coating layers disposed between the perpendicular magnetic recording layer and the overcoat layer, each coating layer comprising a material having a surface energy that is progressively greater than the prior adjacent layer.

13. A method for producing a perpendicular magnetic recording media with increased grain segregation, the method comprising:
providing a substrate comprising a rigid support structure for depositing a plurality of layers thereon;
depositing a soft underlayer on top of the substrate;
depositing an intermediate layer on top of the soft underlayer;
providing a plurality of prospective segregants, each prospective segregant comprising a material with a heat of formation greater than about 130 kilocalories per mole and less than about 230 kilocalories per mole and a surface energy less than about 300 milijoules per square meter;
selecting the prospective segregant with a lowest surface energy;
forming a magnetic recording layer on top of the intermediate layer, the magnetic recording layer having a first coercivity and an axis of magnetic anisotropy substantially perpendicular to the surface thereof; and forming at least one coating layer immediately adjacent to the magnetic layer, the at least one coating layer comprising a material having a surface energy that is greater than a prior adjacent layer.

14. The method of claim 13, wherein the prospective segregants comprise a material selected from the group consisting of Oxides, Nitrides and Carbides.

15. The method of claim 13, wherein the prospective segregants comprise Oxides.

16. The method of claim 15, wherein the Oxide is selected from the from the group consisting of Tungsten Oxide, Vanadium Oxide, Molybdenum Oxide, Rhenium Oxide, Germanium Oxide and a Tantalum Oxide.

17. The method of claim 13, wherein the prospective segregant selected has a surface energy between about 80 milijoules per square meter and about 300 milijoules per square meter.

18. The method of claim 13, wherein the Cobalt alloy comprises an alloy selected from the group consisting of CoPt and CoPtCr.

* * * * *

UNITED STATES PATENT AND TRADEMARK OFFICE
CERTIFICATE OF CORRECTION

PATENT NO. : 7,879,470 B2  
APPLICATION NO. : 11/940960  
DATED : February 1, 2011  
INVENTOR(S) : Qing Dai et al.

Page 1 of 1

It is certified that error appears in the above-identified patent and that said Letters Patent is hereby corrected as shown below:

Column 9, Line 26
"from the from the group" should read "from the group"

Column 11, Line 11
"from the from the group" should read "from the group"

Signed and Sealed this
Eighth Day of March, 2011

David J. Kappos
*Director of the United States Patent and Trademark Office*